Dec. 15, 1925.
W. A. KEE
CHECK VALVE
Filed Dec. 30, 1924
1,565,650
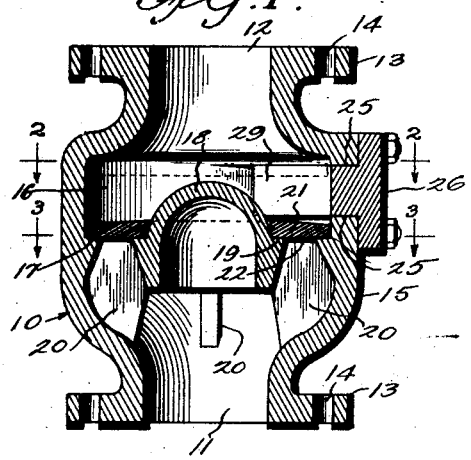
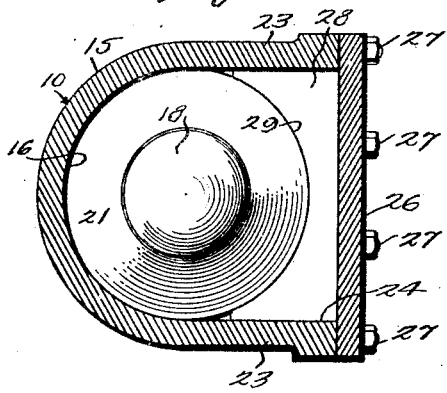
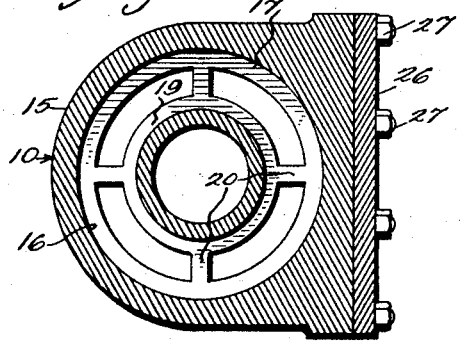
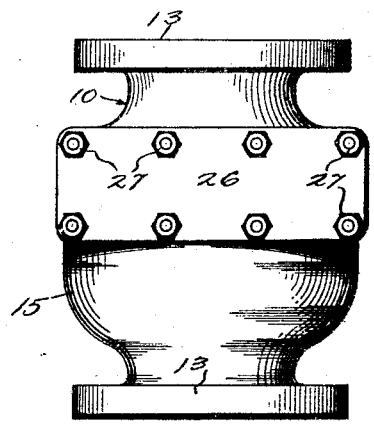
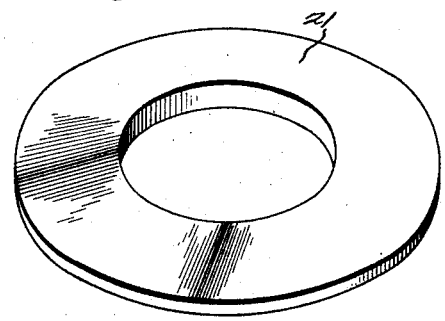
Inventor
William A. Kee
By G.W. Earnshaw
Attorney Patented Dec. 15, 1925.

1,565,650

UNITED STATES PATENT OFFICE.

WILLIAM A. KEE, OF JOPLIN, MISSOURI, ASSIGNOR OF ONE-FOURTH TO JESSE A. WORLEY AND ONE-FOURTH TO CULLIS M. HUMPHREYS, BOTH OF BAXTER SPRINGS, KANSAS.

CHECK VALVE.

Application filed December 30, 1924. Serial No. 758,870.

*To all whom it may concern:*

Be it known that I, WILLIAM A. KEE, a citizen of the United States, residing at Joplin, in the county of Jasper and State of Missouri, have invented certain new and useful Improvements in Check Valves, of which the following is a specification.

This invention relates to check valves and more particularly to an integral valve body having a substantially circular seat adapted to be engaged by a floating disk valve.

An important object of the invention is to provide means to permit the insertion or withdrawal of the disk valve from the side of the valve casing without disconnecting the valve from the associated piping.

A further object of the invention is to provide a device of the above mentioned character provided with a substantially circular valve seat opening of substantial area adapted to be covered by a disk valve which may be readily removed from the side of the valve casing.

Other objects and advantages of the invention will be apparent during the course of the following description.

In the drawings I have shown one embodiment of the invention. In this showing,

Figure 1 is a central vertical sectional view,

Figure 2 is a section on line 2—2 of Figure 1,

Figure 3 is a similar view on line 3—3 of Figure 1,

Figure 4 is a side elevation of the valve, and,

Figure 5 is an enlarged detail sectional view of the valve element.

Referring to the drawings the numeral 10 designates a preferably integral valve casing having inlet and outlet openings 11 and 12 respectively. The valve casing may be provided at its opposite ends with flanges 13 provided with apertures 14 to receive bolts by means of which the valve casing may be suitably connected to similarly flanged inlet and outlet pipes. It will be obvious of course that the valve casing may be provided with any suitable securing means for connecting the valve casing to the inlet and outlet pipes. The portion of the valve casing intermediate the ends is substantially enlarged as at 15 to provide a substantially circular inner valve chamber 16. The chamber 16 is provided intermediate its ends with a horizontal annular valve seat 17. The chamber 16 is also provided substantially axially thereof with a dome 18 having an an outwardly projecting annular flange 19 which is substantially flush with the seat 17 and cooperates therewith to form a unitary seat adapted to be engaged by a valve to be described. The dome 18 is preferably connected to the valve casing by means of integral webs 20 as shown in Figures 1 and 3. It will be obvious that the spaces between the seats 17 and 19 and between the webs 20 form in effect a circular valve seat opening having an area substantially equal to the area of the inlet opening 11 or outlet opening 12.

A valve element 21 is arranged within the casing and has a horizontal lower face 22 which is adapted to engage the seats 17 and 19 as will be obvious. The valve 21 is preferably slightly narrower than the space between the dome 18 and the inner wall of the valve chamber 16 so that the valve is adapted to freely partake of vertical movement within reasonable limits.

The casing 10 is provided above the valve 21 with integral oppositely arranged and laterally extending walls 23 providing an opening 24 in the side of the casing as clearly shown in Figures 1 and 2. The inner faces of the walls 23 are preferably tangential to the inner surface of the valve chamber 16, as shown. The opening 24 is provided with flat upper and lower faces 25 so that it will be obvious that the opening 24 is substantially rectangular in shape. Means are provided for closing the opening 24 when the valve is in operation. As shown a closure plate 26 is adapted to be arranged over the outer end of the opening 24 and is adapted to be secured to the valve casing by suitable bolts 27. The closure plate 26 is also provided with an inwardly projecting portion 28 which substantially fills the opening 24 and is provided with an arcuate inner end 29, the face of which forms a substantial continuation of the circular inner wall of the chamber 16, as shown in Figure 2. It will be obvious that the space between the walls 23 of the opening 24 is at least as great as the diameter of the valve element 21 for a purpose to be described, and the lower face 25 of the opening is arranged a slight distance above the valve seats 17 and 19.

The operation of the device is as follows: The valve casing, without the valve 21 or closure member 26 is connected at its opposite ends to suitable piping wherever desired. The valve element 21 is then inserted through the opening 24 and allowed to drop to the position shown in Figure 1 of the drawings. The closure member is then arranged in position and secured to the casing by means of the bolts 27 whereupon the valve is ready to be placed in operation. It will be obvious that when the device is employed in the position shown in Figure 1, liquid is adapted to flow upwardly through the opening 11 and to lift the valve 21 from its seats 17 and 19 whereupon it may continue its movement from the valve casing through the opening 12. The valve 21 obviously is permitted to move substantially to the dotted line position shown in Figure 1, the liquid flowing through the valve seat and through the opening in the center of the valve. Downward movement of the liquid of course is prevented by the valve 21. When the liquid tends to flow downwardly the valve 21 will immediately return to closed position preventing downward flow of the liquid. If it becomes desirable to remove the valve for any reason it will be obvious that the closure plate 26 may be removed from the casing and the valve 21 may be withdrawn through the opening 24 without disturbing the connection between the valve casing and its associated piping. The provision of an integral valve casing as shown with a relatively large valve is permitted by virtue of the means for removing the valve from the side of the casing. It will be obvious that the upper end of the chamber 16 serves to limit the upward movement of the valve 21 and the latter is effectually guided in its vertical movement by the inner wall of the upper chamber 16 and the cooperating inner face 29 of the closure member.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. A check valve comprising a relatively large valve chamber having substantially axial inlet and outlet openings, a valve seat arranged in said chamber, a valve adapted to engage against one side of said seat, said casing being provided with a substantially radial opening substantially equal in width to the diameter of said valve, and a cover for said radial opening, a portion of said valve being adapted to engage the walls of said chamber to be guided thereby, said cover being provided with an inward extension adapted to engage another portion of said valve to serve as a guide therefor.

2. A check valve comprising a relatively large valve chamber of substantially circular cross section having relatively restricted axial inlet and outlet openings, a pair of spaced concentric valve seats arranged within said chamber, a disk valve adapted to engage said seats and substantially fitting within said chamber, said valve being provided with a central opening, said chamber being provided with a radial opening communicating with said chamber, said opening having opposite sides spaced apart a distance at least equal to the diameter of said valve and substantially tangential to the inner wall of said chamber, and a cover for said radial opening, said cover being provided with an inwardly extending portion the inner end of which forms a substantial continuation of the circular inner wall of said chamber.

In testimony whereof I affix my signature.

WILLIAM A. KEE.